(12) United States Patent
Baekke et al.

(10) Patent No.: US 6,272,446 B1
(45) Date of Patent: Aug. 7, 2001

(54) SYSTEM AND A METHOD FOR MEASURING A CONTINUOUS SIGNAL

(75) Inventors: Jorgen Steen Baekke, Vedback; Finn Brock Petersen, Glostrup; Orla Mayland Olsen, Smorum; Jes Sorensen, Allerod, all of (DK)

(73) Assignee: Bruel & Kjaer Sound & Vibration Measurement A/S (DK)

( * ) Notice: Subject to any disclaimer, the term of this patent is extended or adjusted under 35 U.S.C. 154(b) by 0 days.

(21) Appl. No.: 09/091,531

(22) PCT Filed: Dec. 23, 1996

(86) PCT No.: PCT/DK96/00552

§ 371 Date: Jul. 30, 1998

§ 102(e) Date: Jul. 30, 1998

(87) PCT Pub. No.: WO97/23765

PCT Pub. Date: Jul. 3, 1997

Related U.S. Application Data

(63) Continuation of application No. PCT/DK96/00552, filed on Dec. 23, 1996, now abandoned.

(30) Foreign Application Priority Data

Dec. 22, 1995 (DK) .................................................... 1467/95

(51) Int. Cl.$^7$ ............................. G06F 15/00; H04B 15/00
(52) U.S. Cl. ........................ 702/189; 702/190; 702/191; 342/88; 342/89
(58) Field of Search .................................... 702/189, 190, 702/191; 340/853.2, 855.5, 856.3, 307, 310.03; 370/278, 280, 282, 301, 304; 342/82, 88, 89; 367/117, 135, 137, 140

(56) References Cited

U.S. PATENT DOCUMENTS

| | | | |
|---|---|---|---|
| 3,701,113 | 10/1972 | Chace et al. | 340/172.5 |
| 3,787,635 | 1/1974 | Kammerl et al. | 179/18 ES |

(List continued on next page.)

FOREIGN PATENT DOCUMENTS

| | | | |
|---|---|---|---|
| 1 507 609 | 4/1978 | (CA) | H04J/3/00 |
| 153 437 | 9/1985 | (EP) | G08C/15/00 |

(List continued on next page.)

OTHER PUBLICATIONS

International Search Report; PCT/DK96/00552; Dec. 23, 1996; Odette Durand–Fleith; Apr. 14, 1997.

(List continued on next page.)

*Primary Examiner*—Kamini Shah
*Assistant Examiner*—Bryan Bui
(74) *Attorney, Agent, or Firm*—Fish & Richardson P.C.

(57) ABSTRACT

A system, and method of operating the system, for measuring a continuous signal, having at least two transducers for measuring the continuous signal and for each outputting a signal relating to the measured signal. The transducers receive controlling signals and operate in accordance therewith, the controlling signals being transmitted to the transducers along the same transmitting path consisting of no more than two electrical conductors or no more than one optical conductor or consisting of transmitters and receivers for wireless communication. Alternatively or optionally, the signal generator may receive power over two electrical conductors over which the signals are transmitted from the signal generator. The present system is especially useful in audio or in setups performing determination and analysis of vibration, acceleration, velocity or sound.

64 Claims, 4 Drawing Sheets

U.S. PATENT DOCUMENTS

| | | | |
|---|---|---|---|
| 3,940,568 | 2/1976 | Rutkowski et al. | 179/18 ES |
| 4,101,958 | 7/1978 | Patterson et al. | 364/200 |
| 4,315,263 * | 2/1982 | Neidell | 342/451 |
| 4,454,509 * | 6/1984 | Buennagel et al. | 340/825.06 |
| 4,589,081 * | 5/1986 | Massa et al. | 702/185 |
| 4,686,655 * | 8/1987 | Hyatt | 367/59 |
| 4,688,183 | 8/1987 | Carll et al. | 364/554 |
| 4,727,475 | 2/1988 | Kiremidjian | 364/200 |
| 4,737,657 | 4/1988 | Jatko et al. | 307/85 |
| 4,748,620 | 5/1988 | Adelmann et al. | 370/94 |
| 4,831,558 | 5/1989 | Shoup et al. | 364/550 |
| 4,866,606 | 9/1989 | Kopetz | 364/200 |
| 4,907,176 | 3/1990 | Bahnick et al. | 364/551.01 |
| 5,012,253 * | 4/1991 | Schuster et al. | 342/203 |
| 5,122,970 | 6/1992 | Gilbert et al. | 364/506 |
| 5,343,404 * | 8/1994 | Girgis | 702/72 |
| 5,546,090 * | 8/1996 | Roy, III et al. | 342/42 |
| 5,566,180 | 10/1996 | Eidson et al. | 370/94.2 |

FOREIGN PATENT DOCUMENTS

| | | | |
|---|---|---|---|
| 244 808 | 11/1987 | (EP) | G08C/19/02 |
| 319 010 | 6/1989 | (EP) | H04R/1/22 |
| 326 040 | 8/1989 | (EP) | H04R/1/22 |
| 335 892 | 10/1989 | (EP) | H04R/1/22 |
| 356 327 | 2/1990 | (EP) | H04R/3/00 |
| 415 760 | 3/1991 | (EP) | H04Q/9/14 |
| 434 435 | 6/1991 | (EP) | H04B/7/26 |
| 493 986 | 7/1992 | (EP) | H04R/3/00 |
| 542345 | 5/1993 | (EP) | H04B/1/20 |
| 564 874 | 10/1993 | (EP) | H04R/3/00 |
| 581 262 | 2/1994 | (EP) | H04R/3/00 |
| 2 087 612 | 12/1971 | (FR) | G01D/5/00 |
| WO 93/10645 | 5/1993 | (WO) | H04R/3/00 |
| WO 95/29479 | 11/1995 | (WO) | G10K/11/34 |

OTHER PUBLICATIONS

Universal Serial Bus Specification Revision 0.9; pp. iii–25.

Minutes of the IEEE–TC9/NIST Networked Smart Transducer Interface Standards Meeting, Palo Alto, CA; Sep. 18, 1995—Sep. 20, 1995; pp. 1–22.

Fifth IEEE/NIST Workshop on IEEE–P1451 Smart Transducer Interface Standards Meeting; Nov. 15–17, 1995 National Institute of Standards & Technology, Gaithersburg, MD.

"Where Will Smart Homes Get Their Smarts", Electronic Design, Clifford Meth; Sep. 18, 1995; pp. 61–63.

IEEE TC–9/NIST Smart Transducer Interface Standard Information Gathering Project; Roger Grace, Chairman– Market Study Committee; May 1995.

"The World of Sensors Bristles With Activity"; Cheryl Ajluni; Electronic Design; Sep. 5, 1995; pp. 85–88.

"Interfacing Sensors and Network Gaining Momentum . . ."; Electronic Design; Oct. 24, 1995; pp. 39–44.

* cited by examiner

SYSTEM AND A METHOD FOR MEASURING A CONTINUOUS SIGNAL

This is a continuation of International Application PCT/DK96/00552, with an international filing date of Dec. 23, 1996, now abandoned.

The present invention relates to systems wherein signals are transmitted from at least two signal generating sources to a receiving means and wherein the signal transporting means used for this transmission are also used for transmitting data or power from the receiving means to the signal generating sources.

BACKGROUND OF THE INVENTION

A system of this type is eg an audio system where a number of microphones or other transducers are connected to receiving equipment (eg mixing or measuring electronics) and where the operation of the microphones or electronics connected thereto is to be controlled during operation of the system. The operation to be controlled may be the direction characteristics of microphones or filtering or amplification taking place before or after A/D conversion of the measured signal. In this type of system, it will be desired that the controlling of the microphones or electronics connected thereto is performed from the site of eg the mixing electronics in order to be able to perform all actions from this site.

Another type of system wherein the present invention may be used is a system where signals are transferred from signal generating means to a signal receiving means and where power is to be supplied to the signal generating means.

In general, a number of problems may be encountered in systems where a large number of cables are required in order to interconnect the individual elements of the system.

If, eg, the system is one for measuring sound emitted by a car in a wind tunnel, a large number of sound measuring transducers are positioned in the car and in the wind tunnel in order to measure the sound emitted therefrom and in order to subsequently or simultaneously be able to exactly determine where in the car noise is generated.

Thus, a large number of transducers are to be connected to a common signal receiving and processing unit wherein the signals are intercorrelated in order to determine where in the car noise is generated.

In setups of this type, problems will easily occur during setting up, as cables to the individual transducers may accidentally be interchanged. Should this happen, the calculations performed in the processing step will produce erroneous results due to the fact that the sound pattern assumed by the calculations is not the factual sound pattern in the car.

The problem will be additionally increased, if the transducers are connected to pre-amplifiers and/or A/D converters which are to be controlled during the operation of the system. In this situation, cables will also be required for the controlling signals for the A/D converters.

A similar problem will be present, if the A/D converters or other signal sources require power from power sources. In this situation also power cables are to be provided in the system.

Having to provide additional cables will increase the probability of errors taking place. Finding and correcting an erroneously connected cable may be time and resource consuming and is in no way desired. In fact, even detecting that a problem exists is difficult.

Another advantage of providing a more simple cable having a smaller number of eg electrical or optical conductors is the fact that the connectors typically interconnecting the electronics and the cable may be made smaller and with a smaller weight. This provides the opportunity to provide less support for the connectors and eg to provide smaller boxes or the like for the electronics.

Providing eg three different cables to an acceleration transducer incorporating an A/D converter will put demands as to the size and strength of the transducer just in order to provide space for three connectors and in order to provide sufficient strength of the casing thereof so as to withstand assembly/disassembly of the connectors.

In addition, the fastening of the transducer to eg the car must be strong enough for holding the weight of the transducer, the connectors of the cables and part of the cables. Providing just a single cable may provide smaller transducers and reduced demands to the fastening and support therefore.

Furthermore, larger and heavier transducer casings may deteriorate the overall and directional sensitivity as well as the frequency response of the transducer. In general, the smaller the weight of certain types of transducers, the better the measuring characteristics thereof.

Thus, it is an object of the present invention to provide a system in which the number of cables or other signal transferring means may be reduced due to the fact that the cables may be used for more than a single purpose.

It is another object of the invention to enable existing setups comprising fixed or non-fixed cables to be used for more complex uses. In this manner, no additional cables need be provided.

A third object of the invention is that of providing a system in which the individual parts may have different dates of obsolescence in that the invention makes the date of obsolescence of eg cable setups at least more independent of that of the electronics communicating therethrough. Procuring electronics requiring additional cables will automatically make not only the old electronics but also the existing cable structure obsolete. This is avoided by the present invention.

A fourth object of the invention is providing a more simple setup as the identification of external units may be obtained through standard communication with these units—also during operation. Thus, pen&paper mapping of the system in order to prevent errors during setup is obviated. Subsequent to setting up the system, the actual setup may be obtained via the transmitting cables.

A fifth object may be seen in the audio field, where an especially critical situation may arise during eg concerts where a set of main microphones are used for measuring the overall sound of eg an orchestra and where a number of assisting microphones are used for measuring the sound of individual instruments or singers. Due to the main and assisting microphones having different distances to the instruments/singers, a filtering effect may be obtained in the combined signal. This problem may be solved by adding time delays at appropriate positions. However, these time delays should be determined within quite narrow tolerances in order to avoid the filtering effect. The system and method of the invention aids in this direction.

Systems using the same cables for more than one purpose have been suggested for a number of purposes.

Smart sensors have been suggested for use in a number of electrical appliances in homes in order to be able to control or at least monitor the operation of these appliances from a central console. In Electronic design, Sep. 18, 1995 "Where Will Smart Homes Get Their Smarts?", Clifford Meth, a system where these sensors are interconnected via the normal power lines of the home is described.

In this system, the sensors monitor the operation of the appliances and transmit information over the power lines to the console.

Another system wherein information is transmitted over cables used for transmitting additional information is described in a questionnaire issued by the Market Study Committee "IEEE TC-9/NIST Smart Transducer Interface Standard Information Gathering Project" in May 1995. In this questionnaire an interface standard is suggested between smart transducers and computer networks in order for transducer manufacturers to be able to manufacture transducers generally adaptable to computer networks.

The two above-mentioned systems are of a type where the information from different sensors is typically independent and where the actual timing between transmittal and receipt of the information is not crucial.

A third suggestion of using a two-connector interface for two-way data communication is the Universal Serial Bus Specification (See Universal Serial Bus Specification Revision 0.9 as issued by Compaq, DEC, IBM, Intel, Microsoft, NEC and Northern Telecom). This bus supports "real-time data for voice, audio, and compressed video" (See page 11, item 3.1). In addition, this bus furthermore supports additional data transported via the same two connectors. In this context, "real-time" means that a maximum latency of 1 ms is guaranteed from an external unit to the receiver.

However, due to this bus being adapted to internal communication in computers—typically multi media computers—the data transferred therethrough is packed in data blocks. In addition, this bus does not support cables longer than 5 meters. The limits to the latency and the cable length is set by the handshaking taking place in connection with the communication over this bus.

A different situation exists, if the timing between the signals transmitted from the signal generators, such as a number of transducers with pertaining A/D converters, is of importance to the system. In this situation, the above-mentioned systems would not suffice, as standard or even dedicated computer networks, which are normally used for transferring information from one site to the other, are not designed to guarantee that the information from two independent signal sources to a common receiver is timed in a given manner.

In typical computer networks, the information will be transmitted from transmitter to receiver, but the network does not guarantee when this transmission will take place. In addition, these networks do not detect any delays in transmission.

In eg stereo audio systems, the maximum acceptable time difference between receipt of the signals representing left and right channel is relatively small, as a too large time difference will be detectable as an erroneous phase of the combined signal. A 1 ms time difference will be detectable using the human ear and is not at all accepted in eg professional audio such as in sound studios.

The same applies to systems where a number of related signals 20 are measured by a number of eg transducers and which form the basis of a subsequent processing for deriving information about the means emitting the signals, such as in the above wind tunnel system. In these systems, the phase information of these signals is essential. This information may be lost if the system can not at all times fulfil strict timing requirements as to it being determinable whether the signals have been transmitted or measured with a given time difference.

Standard computer networks make an effort out of handling unforeseen stochastic events such as unplugging of parts thereof, turned off equipment, etc. This directly impedes the performance of these networks in the area of the present invention as timing in the networks is eliminated due to these factors.

These are the main reasons why networks similar to computer networks are not used nor contemplated for purposes where a more or less strict real time demand is posed to the system—that is, where the timing between signals from different sources matters. In this type of systems, separate, dedicated cables are typically used for transporting this information in order to ensure that the transmission is not interrupted. The very concept of computer networks is not directed to the solution of problems of this type.

A special aspect of the present type of system which cannot be solved by computer networks is the fact that the signal to be measured typically has to be detected in a manner providing much more data than may be packed into a normal data block in network communication. The timing of a standard computer network will deteriorate if more than a single block is required from the external units. This is due to the fact that timing between individual blocks is also not supported by standard networks.

Therefore, in this aspect the signals typically measured by the present type of system are measured in a manner so that the corresponding signals to be used in the system are transmitted to the receiving means in a more continuous manner. In this way, signals having virtually any time duration may be handled without limitation due to the transmission of the digital signals. However, this type of transmission puts the demands to the system as to the timing of the signals from different transducers.

Systems of this type may additionally be seen from U.S. Pat. Nos. 5,025,653 and 5,357,141, International applications with publication numbers WO 95/08759 and WO 85/05178 as well as in European patent applications with publication numbers EP-A-0 691 542 and EP-A-0 217 509. In EP-A-0 542 345, a system is disclosed wherein information is directed two-ways in a two-wire cable.

BRIEF SUMMARY OF THE INVENTION

In another aspect of the invention, the digital values of a more or less continuous signal may be converted into blocks and transmitted, if the timing between blocks is known. This may be obtained by eg providing timing information in the blocks or by transmitting the blocks at predetermined time intervals.

In a first aspect, the present invention relates to a system for measuring a continuous signal, the system comprising:
  at least two transducer means for measuring the continuous signal and for each outputting a signal relating to the measured signal, the transducer means being adapted to receive controlling signals and to operate in accordance therewith,
  receiving means for receiving and processing signals from each transducer means and comprising means for generating controlling signals for controlling the operation of the transducer means,
  transmitting means for transmitting the signals from each transducer means to the receiving means, and
  means for transmitting the controlling signals from the receiving means to the transducer means, the receiving means being adapted to, from two signals received from two transducer means measuring a signal emitted from a signal emitting means, determine within a calculatable upper uncertainty, which is less 100 µs, any time difference between the measurement of the signal by the two transducer means, wherein:
the transmitting means constitute the means for transmitting the controlling signals, and
the transmitting means either consist of no more than two electrical conductors or no more than one optical conductor or the transmitting means comprise transmitters and receivers for wireless communication.

Thus, eg the digital signals from an A/D converting means and the signals for controlling the A/D converting means are transmitted by the same electrical or optical conductor(s) or via transmitters and receivers for wireless communication. In this manner, the same cable or medium may be used for both these transmissions.

Typically, in wireless communication for standard microphones, the signals are analogue signals and a problem of multipath receiving is often encountered causing the sound from the microphone is distorted. To the knowledge of the Applicant, microphones have not been suggested able to receive via a wireless link control information and to operate in accordance therewith. In addition, for transducers for measuring equipment, such as acceleration or velocity transducers, wireless communication may be desired. However, also this has not been disclosed—and in particular not bidirectional communication with the aim to control the operation of the transducer before, during or after operation.

This has the advantage that existing setups and existing cables may be used for more extended systems where eg the A/D converting means require controlling signals, even though the system does not provide more than eg a single two-conductor cable from the site of the receiving and processing means to the sites of each of the A/D converting means. Therefore, no additional cables need be drawn. This is an advantage in a number of setups where fixed cables are provided with plugs positioned at different sites in the test setup where the individual elements (such as transducers and A/D converting means) are required or desired.

In addition, the present invention also renders it possible to provide cheaper cables to the setups as eg typical two-conductor cables are much cheaper than multi core cables.

Also, as the system is able to determine the time difference between the signals from different transducer means, suitable time delays may be inserted in order to eg have all signals reach a given point (such as a recording medium, a mixing means) within a given time interval. This will remove the filtering effect in the above-mentioned problem seen in the audio field.

In this context, the signal to be measured may be any type of signal such as noise emitted by a car passing by a number of 10 microphones, the sound from an orchestra, vibration measurements from a car in a structural vibration test a.s.o. This signal, which typically is a complex signal, may be both digital or analog.

The term "signal" should in this context be interpreted in the broadest possible sense, as it may mean things as different as the more or less independent vibrations of different parts of eg a car in a vibration test and the individual instruments of an orchestra. In general, the signal is generated by a single entity, this entity may, however, comprise a number of more or less independent elements all participating to the signal.

The transducer means of the system are typically positioned at different locations and/or with different directions so as to measure different aspects of the signal. These different aspects may be different instruments of an orchestra or the noise from a car passing by at different locations in or around the car or they may be measured in different positions, directions a.s.o.

It should be noted that the transducers of the present system may be of different types measuring different physical manifestations of the signal or of the physical phenomenon generating the signal. Thus, in the above pass-by-test example, transducers may be provided for detecting sound and for measuring the acceleration/vibration/displacement/velocity of different parts of the car to enable the system to determine any dependency of the two manifestations.

In general, in this type of systems, the minimum demand as to the timing of signals from two transducer means is that the system must be able to depend on that signals measured at the same time are timeable within 100 µs when received by the receiving means.

In the present system, the signals from the transducer means may be transferred to the receiving means by electrical or optical conductors or by wireless communication.

The signals from the transducer means may be both digital or analog, continuous or non-continuous.

A continuous analog signal is a signal of the type typically produced by eg a microphone.

In the present context, a "continuous digital signal" is a signal comprising a continuous flow of digital values. An example of a flow of this type may be seen from a continuous signal measured by a microphone the output of which is converted into digital form by an A/D converter at equidistant positions in time. The output of this A/D converter will be a continuous flow of digital values representing the signal at the times of clocking of the A/D converter. In this situation, the time between two conversions of the A/D converter will determine the time elapsing between two digital values in the continuous digital signal. Thus, the rate of information flow in the signal is substantially equal to the rate of generation thereof (such as the conversion of the A/D converter).

A non-continuous digital signal is typically a signal having a rate of data transmission that is higher than eg the rate of generation thereof (such as the conversion of an A/D converter). In this type of signal, the incoming values are buffered and transmitted at a higher rate, when a predetermined number of values has been buffered.

In the present system, the measured signal is typically varying and has a periodic content. In this situation, this period is often important to the system and should therefore be detectable in the system. Thus, the calculatable upper uncertainty is preferably less than 2 periods of the measured signal, such as less than 1 or ½ period, preferably less than $\frac{1}{10}$ period, such as less than $\frac{1}{50}$ period, preferably less than $\frac{1}{100}$ period, such than less than $\frac{1}{500}$ period, preferably less than $\frac{1}{1000}$ period of the measured signal.

Typically, a period of the measured signal is the period of a frequency thereof. If the full signal is to be detectable, the period to be taken into account when determining the timing requirements is usually a maximum frequency of the signal to be measured.

Depending on the actual use of the present system, the calculatable upper uncertainty is 10 µs or less, preferably 1 µs or less, such as 100 ns or less, preferably 10 ns or less, such as 1 ns or less, preferably 300 ps or less.

Usually, it is desired that the period of time elapsing between measurement of a signal by a transducer means and receipt of the relating signal by the receiving means is substantially the same for all signals and all transducer means in the system. In this manner, if no buffers are present in the transducer means or in the transporting means, the timing at the receipt of the signals will relate well to the timing between measurement of the signal by the transducer means.

In eg audio systems, typical signals received by the receiving means comprise no information encoded therein relating to the time of measurement of the relating signals. A microphone or any electronics connected thereto usually never encodes timing information in the digital signals. This is the reason why the timing between signals in the system is important.

Usually, the signals comprise information relating to the time of measurement of the relating signals only in the actual time of receipt of the signals by the receiving means. Therefore, it may be desired that the transducer means comprise no means which may act as buffers as these means may—unless these means generate the same or substantially the same delay for all signals in all transducer means—cause that the timing between signals is lost. Usually, also filters and amplifiers cause a small time delay. If this time delay is considered excessively large, these elements may be avoided or, as will be described below, data may be introduced in the transducer means as to this delay in order to have the receiving means compensate therefor.

Naturally, instead of posing the above timing demands to the system in order to render it useful in eg audio systems, it may also be possible to allow the signals received by the receiving means to comprise information encoded therein relating to the time of measurement of the relating signals. In this manner, the demands as to the actual timing between receipt of signals may be made less stringent, as the individual signals now incorporate timing information which could allow the receiving means to subsequently correct the timing of the received signals.

In a preferred system according to the invention, the transducer means comprise:

a transducer for measuring the signal to be measured and for outputting a continuous analog signal representative thereof, and A/D converting means for converting the analog signal to form a continuous digital signal relating to the measured signal, the A/D converting means being adapted to receive controlling signals from the receiving means and to operate in accordance therewith.

Usually, in the A/D converting means, the analog signals from the transducers are sampled substantially equidistantly in time. This is typically the case if calculations are performed using the sampled data. Especially Fourier transformation requires the data to be equidistantly sampled.

In order to maintain the timing of the sampled data, the converted digital signals are preferably transmitted to the receiving means without any deliberate delay. If the delay is suitably small, the times of receipt of different signals may be directly used instead of the time of measurement of the relating signals. In fact, the present system preferably is independent of delays—as long as the delays in the individual transducer means are identical—or as identical as required.

No matter the type of transducer means used in the system, these transducer means are preferably adapted to generate additional data for use in the receiving means and to output said data to the transmitting means.

These additional data may eg relate to the status of the actual transducer means or the identity thereof.

In this manner, the identity of the transducer means may be determined by simply requesting this information over the cable interconnecting the receiving means and the transducer means in question. Therefore, all transducer means may simply be connected to the receiving means without requiring this interconnection to be eg recorded in a reproducible or controlled manner. Subsequent to connection, a request may be sent over the cables and the identity of the actual transducer means connected thereto may be determined. This obviates the problem of interchanged cables causing subsequent calculations to provide erroneous results.

The additional data may also be the status of the transducer means—such as an A/D converting means thereof. This status may relate to specifics of the conversion taking place or of filtering or other signal treatment taking place in the A/D converting means while operating to convert signals.

Also, the additional data may relate to a delay caused by the transducer means between measurement of a signal and output of the relating signal. Different transducers may comprise different modulators, filters or converters. Different circuits of these types may have different delays. Therefore, the transducer means may comprise information relating to its delay—or to a number of delays relating to a number of different eg filters which may be used in the actual transducer means.

Furthermore, the additional data may relate to a calibration present in the A/D converting means. This calibration may be a calibration of the transducer in the transducer means. In this manner, the transducer means comprising a transducer and an A/D converting means may constitute a calibrated set, where the A/D converting means perform a correction of eg the signals from the transducer before transmitting the digital signals further into the system.

Using calibrated sets has the advantage that the whole system may be accredited once and for all. Adding or replacing a transducer means in the system will subsequently merely require that the new transducer means is calibrated or accredited in order to again have the whole system accredited.

Alternatively, the receiving means may request information of the calibration required from the transducer means, such as from an A/D converting thereof, so that the calibration may be performed in the receiving means.

Depending on a number of factors, it may be desired to alter the signals converted in the A/D converting means before, after or during conversion.

Thus, the A/D converting means may comprise means for altering the characteristics of the analog signal prior to conversion thereof.

Alternatively or additionally, the A/D converting means may comprise means for altering the characteristics of the digital signal subsequent to conversion of the analogue signal.

Finally, the A/D converting means may comprise means adapted to alter specifics of the actual analogue-to-digital conversion.

These means for altering the characteristics of the analog signal prior to conversion thereof, the means for altering the characteristics of the digital signal subsequent to conversion of the analog signal and/or the means adapted to alter specifics of the analogue-to-digital conversion are typically adapted to be controlled by controlling signals output from the receiving means so as to eg have all controlling operations performed from a single site.

This altering of a signal may be performed in order to prepare the signal for a subsequent use thereof. For example, in order to optimally use the A/D converting means, the analog signal may be amplified, integrated, attenuated and/or filtered prior to conversion.

This amplification, attenuation and/or filtering may instead or additionally take place subsequent to conversion.

The above modifications may also be performed in accordance with eg a standardization of the transducer of the set in order to accredit the set.

Naturally, although the transmitting means may use only two electrical or a single optical conductor, these means may comprise other conductors for other uses. Electrical conductors may comprise an additional conductor for shielding against external noise. An optical conductor may comprise electrical conductors for eg transferring power to the transducer means.

An advantage of the present aspect of the invention is the fact that the transmitting means may be of a type usually used for data transmission. A signal transmitting means of this type may be a standard co-axial or a twisted pair cable.

Above, the aspect relates to the fact that the digital signals from a set and the controlling signals to the set may be transferred by the same means, eg the same cable, while retaining the strict timing requirements of the signals.

As a number of the existing A/D converting means and transducers require power from a power source, the receiving means may further comprise a power supply for supplying power to at least one transducer means, and the transmitting means may be constituted by two electrical conductors also transmitting the power from the power supply to the at least one transducer means.

In this manner, also the additional power cable or the like may be obviated so that the transducer means and the receiving means may be interconnected by a single signal transporting means. This will provide the advantage that the existing cables in setups not providing the required number of cables if power, controlling signals and the digital signals were to be transported in different cables, may be used for this more demanding use without the requirement of additional cables.

In an especially preferred aspect, the system of the invention is one wherein each of the at least two transducer means comprises a clocking signal generator generating a signal at least substantially independent of the clocking signals of the clocking signal generators of the other transducer means, each transducer means is adapted to measure the continuous signal in a manner controlled by the clocking signal generated by the individual transducers' clocking signal generator, and the receiving means comprise a common clocking signal generator and is adapted to perform a re-sampling of the received signals to the common clocking signal generated by the common clocking signal generator.

Typically the signals generated by the individual transducer means are sampled, and sampled using at least substantially independent sampling clocks. In this situation, the sample rate from different transducer means will not be in phase. I. order to be able to compare these signals and to perform an analysis thereof, it is desired and preferred that these signals are sampled at the same time—and that they are sampled with the same frequency.

This problem may be solved by re-sampling or sample rate converting the two (or more) signals to the same sample frequency and phase (or converting all but one signal to those of a single signal) in order to be able to directly compare the phases of the signals. This solution also has the advantage that signals from transducer means sampling with different frequencies may be compared. Re-sampling a signal, which has not been sampled with a desired frequency and phase, will generate a signal relating to the original signal measured by the transducer means as it would be, had it been sampled with the desired frequency and phase.

Re-sampling may be performed using the presently available integrated circuits or using custom made hardware or software, such as in operation of a DSP. An advantage of eg the AD 1890 (as manufactured by Analog Devices, USA) is the fact that this circuit may suppress aperture uncertainty in the sampling, when the signal has been sampled equidistantly in time. Even though a signal has been sampled in a transducer means with eg a time precision of 200 ps, the flanges of the square pulses as received at the re-sampling circuit may vary due to external noise (due to susceptibility to external radiation) affecting the pulses during transportation from the transducer means to the re-sampling circuit. Typically, this may cause detection of a flange of a square pulse to vary eg more than 3 ns.

However, the re-sampling circuit will remove this error, as it operates so as to assume that the data received have been sampled equidistantly in time and to correct deviations therefrom.

Due to the operation of the presently available rate conversion circuits, it is presently preferred that the clocking signal generators of the at least two transducer means are adapted to generate clocking signals have a frequency lower than that generated by the common clocking signal generator. This is due to the fact that down-sampling in frequency may cause these circuits to generate different time delays.

In addition, certain of these circuits are adapted to resample any signal—independently of the rate at which it has been sampled—to a predetermined frequency and phase. Thus, the system is self-adapting to transducer means using different sampling rates.

Different transducer means may have different sampling rates depending on their prizes, the signals to be measured etc. In addition, different filters, modulators etc. may be used in order to optimize the individual transducer or type of transducer to a given task. Connecting any transducer means according to the invention to the system will automatically provide a functioning system due to the interaction of the deconverting means. Now the signals from any transducer means may take part in the final eg analysis of the signals, as the receiving and analyzing/storing etc. electronics will always receive signals sampled at the same sampling frequency and phase from the de-converting means.

Therefore, the clocking signal generators of the at least two transducer means may be adapted to generate clocking signals having different frequencies.

Alternatively, the clocking signal generators of the at least two transducer means may be adapted to generate clocking signals having substantially identical frequencies.

In a second aspect, the invention relates to a transducer means for use in the above system according to the invention. This transducer will be able to operate in accordance with controlling signals received from the transmitting means along which it transmits the signals generated by the transducer.

Especially, the transducer may comprise a memory holding information, such as information relating to a delay caused by the transducer from measurement of a signal to transmission of a corresponding signal along the transmitting means, and to output this information along the transmitting means when instructed. This delay information is especially advantageous due to the fact that eg transducers having an A/D converter may have different delays depending on the sample rate of the converter. Thus, in order to enable the above system to take these different delays into account, the system may require and receive this information prior to or during operation.

Transducers of this type may be eg acceleration transducers as well as microphones or other transducers used for measuring vibrations, sound, acceleration, velocity etc.

An alternative to this preferred embodiment is one wherein a clocking signal is transmitted from a central unit to all transducer means so that all transducer means sample the signal to be measured in accordance with this "global" clock.

In a third aspect, the invention relates to a method of operating a system for measuring a continuous signal, the system comprising:

- at least two transducer means for measuring the continuous signal and for each outputting a signal relating to the measured signal, the transducer means being adapted to receive controlling signals and to operate in accordance therewith,
- receiving means for receiving and processing signals from each transducer means and comprising means for generating controlling signals for controlling the operation of the transducer means,
- transmitting means for transmitting the signals from each transducer means to the receiving means, and
- means for transmitting the controlling signals from the receiving means to the transducer means,
- the receiving means being adapted to, from two signals received from two transducer means measuring a signal emitted from a signal emitting means, determine within a calculatable upper uncertainty, which is less 100 $\mu$s, any time difference between the measurement of the signal by the two transducer means,
- wherein:
  - the receiving means generate the controlling signals controlling the operation of the transducer means,
  - the controlling signals output from the receiving means are transmitted by the transmitting means which either consist of no more than two electrical conductors or no more than one optical conductor or comprise transmitters and receivers for wireless communication.

As mentioned above, the measured signal is typically varying and has a periodic content. In this situation, this period is often important to the system and should therefore be detectable in the system. Thus, the calculatable upper uncertainty is preferably less than 2 periods of the measured signal, such as less than 1 or ½ period, preferably less than ¹⁄₁₀ period, such as less than ¹⁄₅₀ period, preferably less than ¹⁄₁₀₀ period, such than less than ¹⁄₅₀₀ period, preferably less than ¹⁄₁₀₀₀ period, such as less than ¹⁄₂₀,₀₀₀ period of the measured signal.

Typically, a period of the measured signal is the period of a frequency thereof. If the full signal is to be detectable, the period to be taken into account when determining the timing requirements is usually a maximum frequency of the signal to be measured.

As is also mentioned above, depending on the signal to be measured, the calculatable upper uncertainty may be 100 $\mu$s or less, such as 10 $\mu$s or less, preferably 1 $\mu$s or less, such as 100 ns or less, preferably 10 ns or less, such as 1 ns or less, preferably 300 ps or less.

The transducer means preferably comprise:

- a transducer for measuring the signal to be measured and for outputting a continuous analog signal representative thereof, and
- A/D converting means for converting the analog signal to form a continuous digital signal relating to the measured signal.

In this situation, the A/D converting means preferably operate in accordance with controlling signals generated by the receiving means.

In order to facilitate the use of the system, it may be desired that the A/D converting means generate additional data, for use in the receiving means, in accordance with the controlling signals generated by the receiving means and output said data to the transmitting means to the receiving means.

These additional data may relate to the status and/or the identity of the A/D converting means or another part of the transducer means.

As described above, the additional data may alternatively or additionally relate to a delay caused by the transducer means.

These additional data are transferred over the same optical or electrical conductors or the wire less link and are typically transmitted with a frequency different from that of the digital signals from the transducer means (typically an A/D converting means thereof) in order to facilitate separation of the signals in the receiving means.

As mentioned above, it may be desired, where the transducer means comprise an A/D converting means, that characteristics of the analog signal are altered in the A/C converting means prior to conversion thereof in accordance with controlling signals generated by the receiving means.

Optionally or additionally, characteristics of the digital signal may be altered in the A/C converting means subsequent to conversion of the analogue signal in accordance with controlling signals generated by the receiving means.

Furthermore, specifics of the analogue-to-digital conversion may be altered in the A/D converting means in accordance with controlling signals output from the receiving means.

Again, an especially preferred aspect of the invention is one, wherein

- each of the at least two transducer means comprises a clocking signal generator generating a signal at least substantially substantially independent on the clocking signals of the clocking signal generators of the other transducer means,
- each transducer means measures the continuous signal in a manner controlled by the clocking signal generated by the individual transducers' clocking signal generator, and
- the receiving means comprise a common clocking signal generator and performs a re-sampling of the received signals to the common clocking signal generated by the common clocking signal generator.

As indicated above, the clocking signal generators of the at least two transducer means may generate clocking signals having a frequency lower than that generated by the common clocking signal generator, the clocking signal generators of the at least two transducer means generate clocking signals having substantially identical frequencies or having different frequencies.

If the re-sampling of the signals is performed in accordance with the Nyquist theorem, the re-sampled signals will have the same time information as that output from the transducer means. Therefore, the receiving means may still, from the resampled signals, determine any time difference, within the above calculatable upper uncertainty, between the measurement of a signal by two transducer means.

In a fourth aspect, the present invention relates to a system comprising:

at least two signal generating means transmitting continuous digital signals, means for receiving and processing the digital signals from the signal generating means, the means for receiving and processing the digital signals being adapted to, from two digital signals received from two signal generating means, determine within a calculatable upper uncertainty being less than 100 µs, any time difference between the transmission of the two digital signals, transporting means for transporting the digital signals from each signal generating means to the receiving means, power supply means for supplying power to the signal generating means, means for transporting power from the power supply means to the signal generating means, wherein:
the receiving means comprise the power supply means, and the transporting means are comprise the means for transporting power from the power supply to the signal generating means and are constituted by at the most two electrical conductors.

In this system, the digital signals from and power to the signal generating means are transported by the same two electrical conductors in order to facilitate the use of power requiring signal generating means without requiring additional cables.

Again, the measured signal is typically varying and has a periodic content. In this situation, this period is often important to the system and should therefore be detectable in the system. Thus, the calculatable upper uncertainty is preferably less than 2 periods of the measured signal, such as less than 1 or ½ period, preferably less than 1/10 period, such as less than 1/50 period, preferably less than 1/100 period, such than less than 1/500 period, preferably less than 1/1000 period of the measured signal.

Typically, a period of the measured signal is the period of a frequency thereof. If the full signal is to be detectable, the period to be taken into account when determining the timing requirements is usually a maximum frequency of the signal to be measured.

Depending on the signals generated by the signal generating means, the calculatable upper uncertainty may be 10 µs or less, preferably 1 µs or less, such as 100 ns or less, preferably 10 ns or less, such as 1 ns or less, preferably 300 ps or less.

Depending on the power required by the signal generating means, the cables used in the system may be of different types. An advantage of the present invention is that especially for signal generating means requiring low voltages and a not too high current, the transmitting means may be of a type usually used for data transmission. Cables of this type may be the ones of existing systems, whereby this additional use of signal generating means requiring power will require no additional cables.

Thus, existing setups, such as setups having fixed cable installations, may be used without amendment of the cable structure with a larger number of different types of signal generating means.

Depending on the nature of the digital signals received by the receiving means these signals may not comprise information encoded therein relating to the time of generation by the signal generating means.

Optionally, the digital signals may comprise information relating to the time of generation by the signal generating means in the time of receipt of the digital signals by the receiving means. In this situation, the time elapsed during transfer of the signals from the signal generating means to the receiving means is preferably the same or substantially the same for all signals and all signal generating means.

Additionally optionally, the digital signals received by the receiving means may comprise information encoded therein relating to the time of generation by the signal generating means. In this situation, the timing demands of the signals may be relieved due to the fact that this information may aid in the timing or synchronization of signals.

The signal generating means adapted for use in the present system may be all types of means generating digital signals, such as means chosen from the group consisting of computers, digital transducers, DAT tape recorders, A/D converting means Also in this aspect, the above-mentioned re-sampling is a preferred embodiment.

BRIEF DESCRIPTION OF THE DRAWINGS

In the following, the invention will be described by way of example in the figures, wherein.

DETAILED DESCRIPTION OF THE INVENTION

Figure 1:
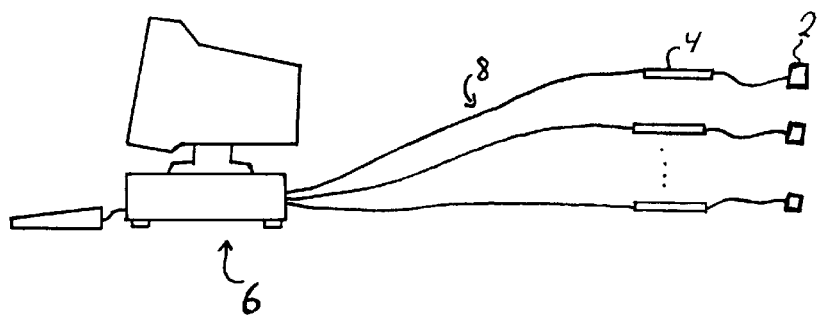
FIG. 1 is an outline of a system according to the invention.

In FIG. 1, a system is outlined wherein a number of vibration measuring transducers 2 are connected to conditioning units 4 which receive the analogue signals from the transducers 2, process and convert these signals into digital signals and transfer the signals to a receiving computer 6 via typical two-conductor cables 8 preferably also having a screen.

A system of this type is widely used in eg vibrational tests for cars wherein it is desired to know how the individual parts of the car are affected during a crash.

In systems of this type, the accelerometers 2 are positioned at a number of positions in the car and having different directions in order to measure the acceleration of the parts of the car to which they are connected in the given direction of the accelerometers.

Naturally, in order to be able to derive this type of information from the signals from the transducers 2, it is imperative that the timing between the individual signals is known. This is a requirement, as otherwise it would be impossible to interrelate the signals from different transducers 2.

Figure 2:
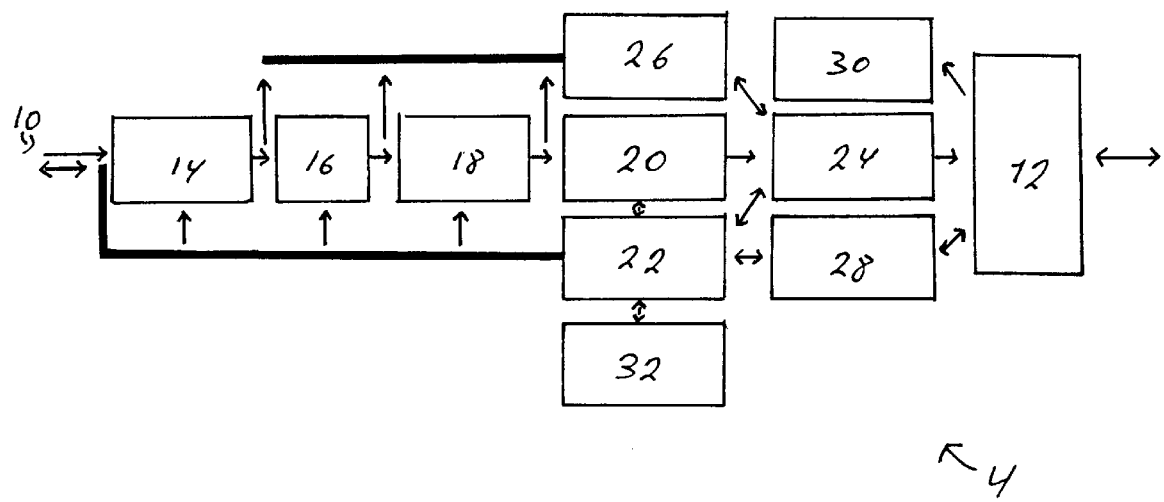
FIG. 2 is a block diagram of a conditioning unit of FIG. 1.

In FIG. 2, a block diagram of a conditioning unit 4 is illustrated which is suitable for the use in eg the system of FIG. 1. Typically, this conditioning unit 4 will be an integrated part of a transducer. However, naturally it may also be a part for eg post-fitting to existing transducers, or different units 4 may be provided for a series of transducer means etc.

This unit 4 comprises an input 10 from the corresponding transducer 2 and an input/output interface 12 for transmitting the digital signals to a cable 8 (not shown in FIG. 2) and to the receiving means 6 (not shown in FIG. 2), and for receiving controlling signals and power via the cable 8.

The analogue signals from the transducer 2 are firstly amplified in a programmable amplifier 14, subsequently filtered in an analogue filter 16 and then again amplified in a programmable amplifier 18. This conditioning of the analogue signal may be either as part of a calibration of the transducer 2 and/or in order to suit the analogue signal to the A/D converter 20 of the unit 4.

The thus conditioned analogue signal is converted into a digital signal in an A/D converter 20.

The converted digital signal is subsequently transferred to a standard AES/EBU transmitter 24 in which a standard protocol for communication is followed. Naturally, also other standard or special purpose transmitters may be used.

The signals from the AES/EBU transmitter 24 are subsequently transferred to the interface 12 for further transmission via the cable 8.

In order to monitor the operation of the unit 4, the amplifiers 14 and 18 and the analogue filter 16 may be connected to an overload detecting unit 26 which is also connected to the transmitter 24 in order to transmit status information relating to overload of an element of the unit 4 to the receiving means 6.

The overload detecting unit 26 may optionally be connected to the Control & Status transceiver 28 via the CPU 22 in order to transfer overload information to the receiving means 6. The difference between the two methods is that overload information incorporated in the signals from the transmitter 24 will be positioned at the correct position in the signal thereof so that the overloaded information may be excluded in the further processing of the signals—if desired. This will typically not be the case if this information is sent via the Control & Status transceiver 28. Typically, overload information transmitted over the Control & Status information link will be used in order to obtain information relating to the actual type of overload having occurred. Different types of statistics as to the type, of overload—but also where in the conditioning unit, the overload occurred—may be determined in the unit 4 and transmitted by the Control & Status link.

Further processing where overloaded information is not desired may be an averaging procedure. Excluding overloaded information from this averaging provides an intelligent averaging of the signals.

In addition, the amplifiers 14 and 18, the filter 16 and the converter 20 are connected to a CPU 22 having a ROM, a RAM and/or an EEPROM in which a program or other data are stored for controlling features of the amplifications, the filtering and the conversion taking place in the unit 4.

The CPU 22 may also be connected via the input 10 to the corresponding transducer 2 in order to also forward controlling signals to the transducer in order to control the operation thereof. Also, the CPU 22 may receive status information (such as information calibration data and/or information relating to overload) from the transducer 2 in order to be able to monitor this status and inform the receiving means 6 thereof via the interface 12 and the cable 8, as part of the normal status information from the unit 4 to the receiving means 6.

The present unit 4 comprises a Control & Status transceiver 28 which corresponds directly with the interface 12 in order to be able to receive control signals from the receiving means 6 and in order to transmit status information to the means 6 via the cable 8.

The control signals received by the transceiver 28 are transmitted to the CPU 22 in order for this to bring into action the instructions of the control signals using the information of the ROM, RAM and/or EEPROM connected thereto. On the basis of these instructions, the CPU 22 may alter the characteristics of the amplifications performed in amplifiers 14 and 18, the characteristics of the filtering in filter 16 and/or of the conversion taking place in the converter 20.

The interface 12 may provide the digital signals from the converter 20 and from the transceiver 28 in different manners in order for the receiving means 6 to be able to subsequently separate the signals.

Depending on the type of signal to be measured, it may be preferred that the digital signals from the converter 20 are sampled at a relatively high frequency (for audio systems on the order of 40|–100 kHz) whereby the control/status signals may be of a considerably lower frequency, such as on the order of 1 kHz. This sampling frequency is the frequency with which the converter 20 converts the actual value of the analogue signal into a digital value.

Otherwise, if a low sampling frequency is desired, the status 10 information may be provided at a higher frequency. In both situations, a simple filter at the interface 12 of the unit 4 and of a similar interface (not shown) of the receiving means 4 may suffice for separating the two signals.

Normally, the status information is provided at a frequency lower than the transmission frequency of the sampled signals in order to be free to increase the sampling frequency—should this be desired at a later point in time.

In addition, the unit 4 may comprise a power supply 30 for supplying power to the elements 12, 14, 16, 18, 20, 22, 24, 26 and/or 28 of the unit 4 and possibly also to the transducer 2 connected thereto. The power supply 30 receives power from the interface 12 which derives the power from the means 6 via the cable 8.

Thus, in the illustrated system, a single two-conductor cable 8 may be provided in order to transmit both the digital signals from the converter 20 to the receiving means 6 and for transmitting control signals from the means 6 to the unit 4 and optionally further to the transducer 2. In addition, the same cable may be used for transmitting data relating to status or identity of the transducer 2 or the unit 4 to the receiving means 6.

There are a number of ways wherein the present system may be used.

Firstly, the unit 4 may comprise in a storage of the CPU 22 data corresponding to a calibration of the transducer 2. Upon request from the receiving means, this data may be transferred to the receiving means which thereafter corrects the data from the unit 4 in accordance with the calibration.

Alternatively, the data transmitted from the receiving means 6 to the unit 4 may be data required in order to calibrate the pertaining transducer 2. If the identity of the transducer 2 is firstly determined through communication via the CPU 22 of the unit 4 to the transducer 2, the corresponding calibration may be down loaded from the receiving means 6 into the storage (ROM, RAM or EEPROM) of the CPU 22 and therefrom as instructions to the amplifiers 14 and 18 and the filter 16. These instructions may adapt the operation of the amplifiers 14 and 18 and the filter 16 in accordance with the calibration.

In this manner, the identity of the individual units 4 and transducers 2 may be determined without having to actually inspect the elements. This also has the advantage that the individual elements may be interconnected without any special care as to which elements are interconnected, as the identity of the individual elements may subsequently be determined. After that, the individual elements may be adapted to each other by eg transferring the correct calibrations to the units 4.

Secondly, the control of the conditioning of the analog signal may optionally or also be in order to suit the analogue signal for the converter 20. A/D converters 20 have a limited resolution, whereby a too amplified or a too attenuated signal will experience a too limited resolution and a too amplified signal will cause an overload. Therefore, it will be desired to ensure that the analogue signal to be converted suits the resolution of the A/D converter 20 as well as possible.

In addition, the present unit 4 is equipped with a bidirectional remote control interface 32 via which it is possible to transmit information to and receive information from the means 6 via the interface 12 and the cable 8.

The type of information transmitted to the means 6 may be the position, direction or identity of the transducer 2 connected to the actual unit 4. This information may be desired/required in the processing of the signals of the system.

Information received from the interface 32 may be information relating to the identity, position, type or status of the unit 4 or of the transducer 2 or other information that is required at the site of the unit 4 during operation or during setting up the test.

Information relating to the position may be desired entered at the transducer in order to avoid any requirements as to pen&paper in order to remember the position of the individual transducer. If a number of transducers are positioned on a drilling rig or a car, it may be desired to enter positional data, such as via a hand held device having a keyboard and via an electrical, optical or wireless link to the actual transducer, so that these data may be read from the transducer to the receiving means via the status link. In this manner, transducers are positioned, positional data entered at the same time. Thereafter, the system may be totally determined from the position of the receiving means.

Another type of system wherein a setup as that of the figures may be used is in professional audio where the signals from a number of microphones are to be recorded. Also in this system it may be desired to convert the analogue signals to digital signals before transmitting these signals to the receiving means. If eg the path from the microphone to the receiving means is long, it may be desired to convert the signal to a digital signal quite near to the microphone in order to avoid long lengths of analogue cable. Analogue signals are vulnerable to receiving noise which will deteriorate the Signals in the cable.

Figure 3:
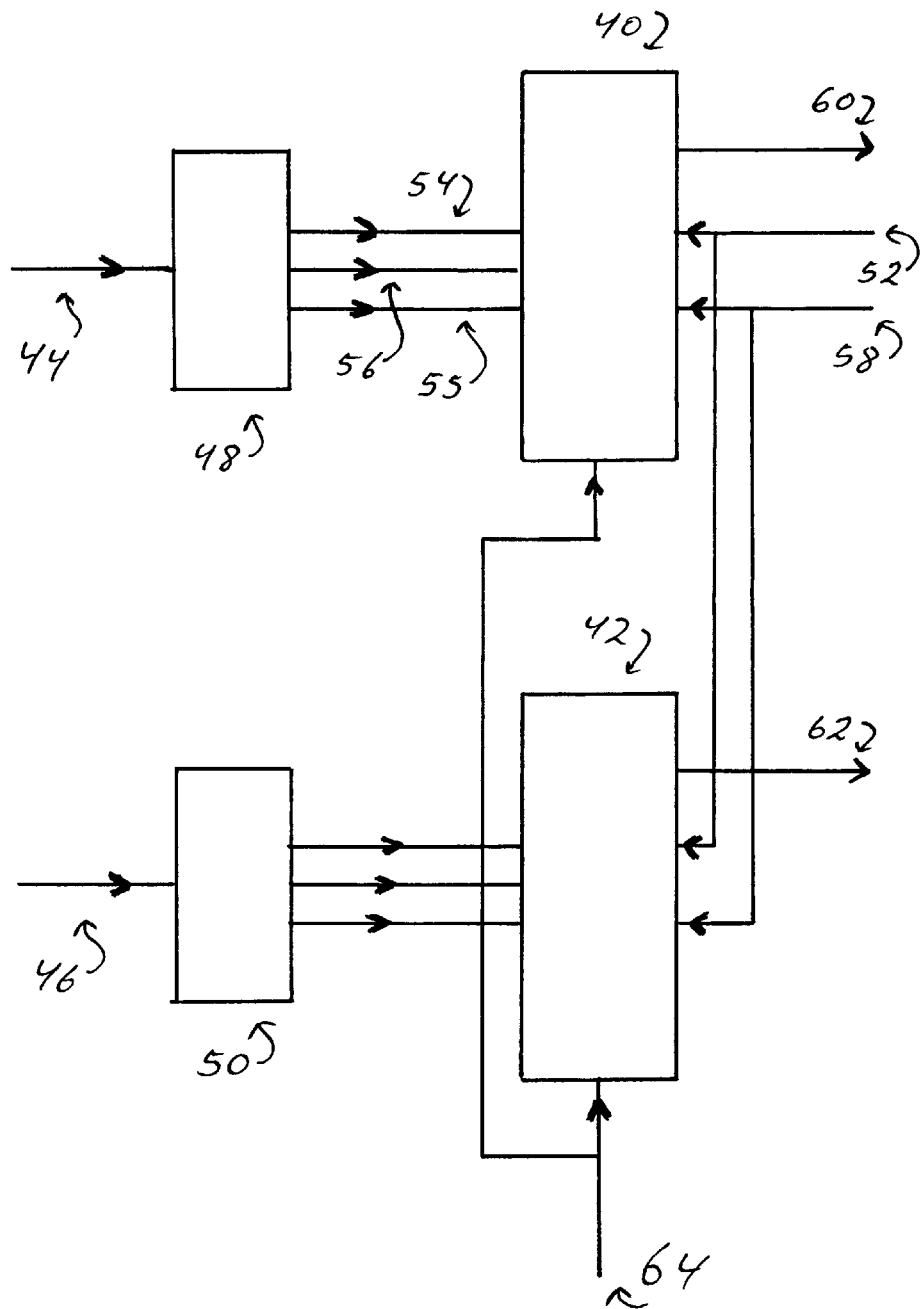
FIG. 3 is an illustration of a setup comprising re-sampling of the signals.

The especially preferred re-sampling of the signals from the transducers may be seen from FIG. 3.

In order to perform a re-sampling from eg 64 kHz to eg 65,536 kHz, two two-channel standard AD 1890's (reference numerals 40 and 42), as manufactured by Analog Devices, USA, are preferably used.

Typically, the two signals (reference numerals 44 and 46) are provided by two A/D converters (not shown), each connected to eg an analogue transducer, and each via an AES/EBU link to an AES/EBU receiver 48 and 50, respectively. These two A/D converters convert the signals from eg the transducers on the basis of independent clocks.

The standard AES/EBU receivers automatically output a number of signals, of which the three signals relating to the data 54, a bit-rate clock 56 and a L/R clock 55 are used.

In this signal, the L/R clock 55 comprises information relating to whether the data 54 output relate to the right or the left channel and the relative sampling time for this signal (AES/EBU is a standard typically used in stereo equipment), and the bit-rate clock 56 defines the bit-rate of the individual bits in the data 54. It should be noted that the output of two transducers may be transmitted over the same AES/EBU link—but only if sampled using the same clock (same frequency and phase). In that situation, the receiving means should take note that data are transmitted in both channels of this link—this is the normal use of AES/EBU.

In this setup, the signals 44 and 46 are input into the two AD 1890's (40 and 42, respectively) as well as a common bit-rate clock 52 (presently at 65,536 kHz), a common L/R clock 58, and a working clock 64 (presently 20 MHz).

The inputs 52 and 58 are inputs of the $I^2S$ standard—type and define the frequency and phase of the re-sampled signals.

The outputs 60 and 62 of the two circuits 40 and 42, respectively, are re-sampled to the frequency of the common L/R clock 58, so that the phases of the two resulting signals 60 and 62 may now be directly compared.

As the circuits 40 and 42 operate according to the Nyquist criteria, the timing relationship between the signals 44 and 46 is also present in the outputs 60 and 62, so that the time difference between the measurement of the signal by two transducer means may still be determined—and within the same calculatable upper uncertainty.

Presently, the sampling in the transducer means is typically performed equidistantly in time and within an uncertainty of less than 200 ps. The circuits 40 and 42 output signals 60 and 62 timely within less than 300 ps, so that the total uncertainty (it should be noted that, as described above, the circuits 40 and 42 suppress time jitter between the transducer means and the circuits 40 and 42) generated between the transducer measuring the signal and the output of the circuits 40 and 42 is on the order of 600–700 ps.

It should be noted that the above uncertainty is that between two channels and not that within a single channel.

From this it may be seen that any time delay in the individual transducer means may make a substantial contribution to the overall time delay. Therefore, the transducer means used with this system may be provided with a memory comprising information relating to this time delay, so that the receiving means may take this delay into account.

Figure 4:
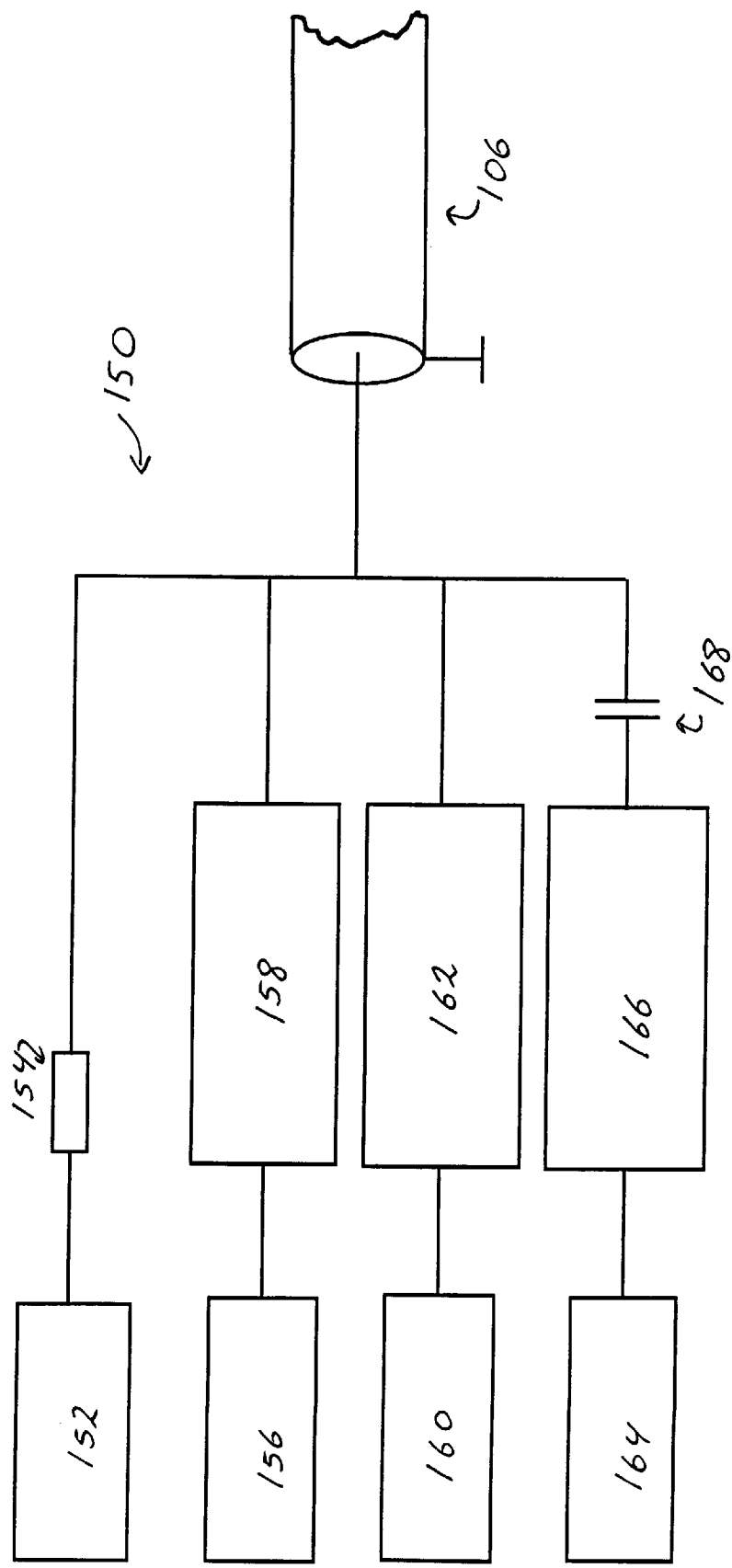
FIG. 4 illustrates the presently preferred setup of the receiving electronics.
Figure 5:
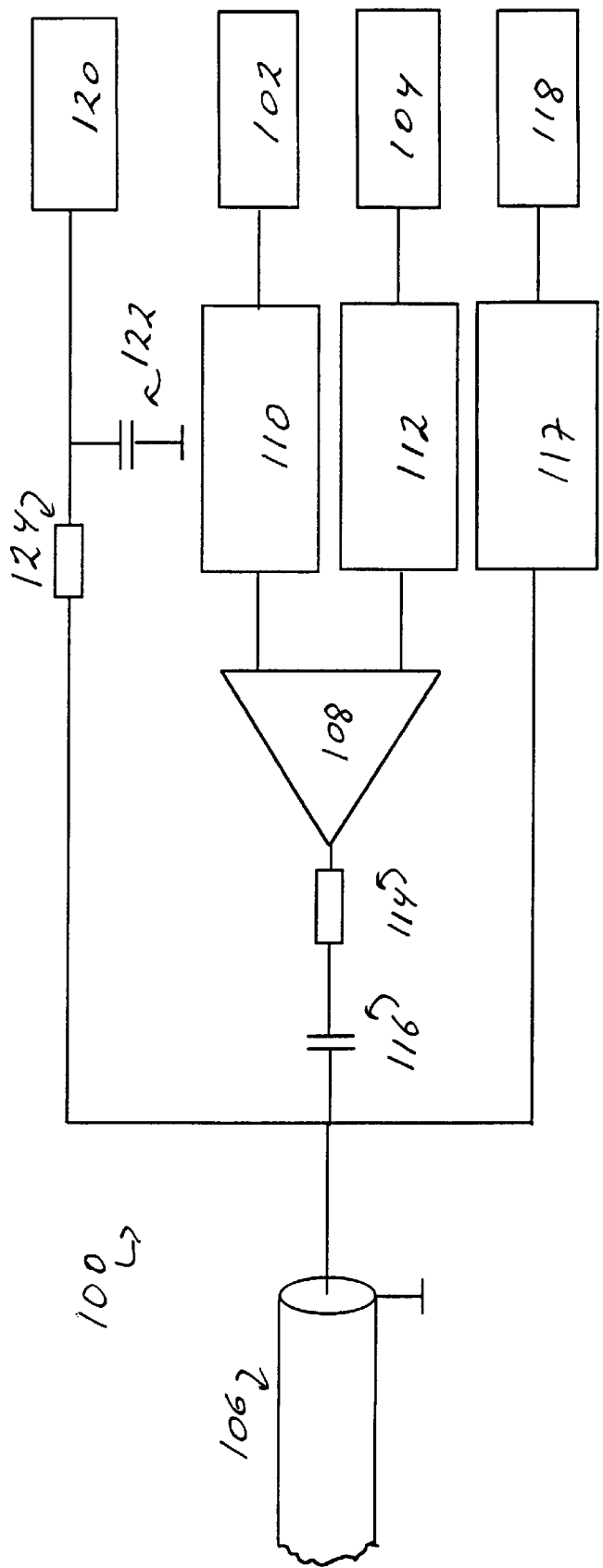
FIG. 5 illustrates the presently preferred setup of the transmitting electronics.

From FIGS. 4 and 5, the presently preferred setup of the receiving and transmitting electronics are illustrated, respectively.

In FIG. 5, digital signals are transmitted from the A/D converter (not shown) of a transducer means (not shown) to a standard AES/EBU transmitter 102 of the transmitting electronics 100—in a standard manner. From the transmitter 102, the signals are transmitted to a standard 50 Ω cable 106 via a phase correction filter 110, a summing amplifier 108, a resistor 114 (100 Ω) and a capacitor 116 (100 nF). The operation of the filter 110 is that of removing distortion otherwise occurring at the corresponding AES/EBU receiver in the receiving electronics described below in connection with FIG. 4.

In addition, status information may be provided by a status transmitter 104 via a low pass filter 112 (1. order, cut-off frequency: 20 kHz) and the amplifier 108.

It is clear that the amplifier 108 sums the signals from the circuits 102 and 104. As these signals have quite different frequencies, the electronics in FIG. 4 will be able to again separate these signals.

Control information may be received from the cable 106 by a control signal receiver 118 via a filter pair 117 (comprising a low pass filter (3. order, cut-off frequency: 25 kHz) and a high pass filter (1. order, cut-off frequency: 100 Hz)—the pair having an entry impedance of more than 10 kΩ).

Power may be received from the cable 106 via a resistor 124 (100 Ω), the source 124 being grounded via a capacitor 122 (1 µF) and forms a DC 48V source.

The above signals and power are connected to the inner conductor of a standard 50 Ω co-axial cable 106, the outer conductor of which is grounded.

In this circuit 100, the transmitting electronics (102, 104, 110, 112, 108 and 114) are DC separated from the DC power due to the capacitor 116, and the receiver 118, if the high pass filter is positioned closest to the cable 106. In addition, due to the resistor 124, the impedance seen from the cable 106 corresponds to the characteristic impedance of the cable 106, so that reflections are suppressed.

In the receiving electronics 150, power is supplied to the cable 106 by a standard DC 48V power supply 152 and a resistor 154 (100 Ω).

The digital signals from transmitter 102 are received in a standard AES/EBU receiver 156 via a high pass filter 158 (2. order, cut-off frequency: 100 kHz and having an entry impedance of more than 10 kΩ).

Status information may be received by a status receiver 160 via a filter pair 162 (comprising a high pass filter (1. order, cut-off frequency: 100 Hz) and a low pass filter (3. order, cut-off frequency: 25 kHz)—the pair having an entry impedance of more than 10 kΩ).

Control signals may be transmitted from a control transmitter 164 via a low pass filter 166 (1. order, cut-off frequency: 20 kHz—and an exit impedance of 100 Ω) and a capacitor 168 (100 nF).

As was the case in the circuit 100, the impedance seen from the cable 106 corresponds to the characteristic impedance of the cable 106. In addition, the electronics 156, 160 and 164 are DC separated from the power if the high-pass filter of the pair 162 is positioned closest to the cable 106.

In the present setup, the control and status receivers and transmitters (104, 118, 160 and 164) may comprise bi-phase encoders and decoders and operate to perform a RS232-type asynchronous communication towards the transmitting and receiving electronics.

In the present system, the status/control signal transmission is performed at a rate of 2400 baud. As both the third and fifth harmonic are preferably incorporated in the signals, and as a bi-phase encoder/decoder is used, the low-pass filters have a cut-off frequency around 20 kHz.

In the present setup, the control/status transmission is a half duplex transmission where the circuit 150 will typically request status data from the circuit 100. Half duplex has been chosen for the sake of simplicity. If the circuit 100 should be able to autonomously transmit status data (such as overload, overheating or the like) a duplex system may be used, wherein data may be transmitted in both directions at the same time.

What is claimed is:

1. A system for measuring a continuous signal, the system comprising:

at least two transducer means for measuring the continuous signal and for each outputting a digital signal relating to the measured signal, the transducer means being adapted to receive controlling signals and to operate in accordance therewith, receiving means for receiving and processing signals from each transducer means and comprising means for generating controlling signals for controlling the operation of the transducer means, transmitting means for transmitting the signals from each transducer means to the receiving means, and means for transmitting the controlling signals from the receiving means to the transducer means, the transmitting means constituting the means for transmitting the controlling signals, and the transmitting means being one of the group of: consisting of no more than two electrical conductors consisting of no more than one optical conductor, and the transmitting means comprising transmitters and receivers for wireless communication, wherein the receiving means are adapted to, from two signals received from two transducer means measuring a signal emitted from a signal emitting means, determine within a calculatable upper uncertainty, which is less than 100 µs, any time difference between the measurement of the signal by the two transducer means wherein the system is adapted to one of the group consisting of:

the transducer means are adapted to encode information in the signals generated thereby, the information received by the receiving means comprising information relating to the time of measurement of the relating measured signal, the receiving means being adapted to use this information in timing or synchronizing of signals, a central unit is adapted to transmit a clocking signal to all transducer means and where all transducer means are adapted to sample the signal to be measured at the same time and in accordance with this clocking signal, and each of the at least two transducer means comprises a clocking signal generator generating a signal at least substantially independent on the clocking signals of the clocking signal generators of the other transducer means, each transducer means is adapted to measure the continuous signal in a manner controlled by the clocking signal generated by the individual transducers' clocking signal generator, and the receiving means comprise a common clocking signal generator and is adapted to perform a re-sampling of the received signals to the common clocking signal generated by the common clocking signal generator.

2. A system according to claim 1, wherein the measured signal is varying and has a periodic content, and wherein the calculatable upper uncertainty is less than 2 periods of the measured signal.

3. A system according to claim 2, wherein the period of the measured signal is that of a frequency thereof.

4. A system according to claim 1, wherein the calculatable upper uncertainty is 10 µs or less.

5. A system according to claim 1, wherein the delay between measurement of a part of a signal by a transducer means and receipt of the relating digital signal by the receiving means is substantially the same for all parts of all signals and all transducer means.

6. A system according to claim 1, wherein the signals comprise information relating to the time of measurement of the relating measured signal in the time of receipt thereof by the receiving means.

7. A system according to claim 1, wherein the transducer means comprise:

a transducer for measuring the signal to be measured and for outputting a continuous analog signal representative thereof, and A/D converting means for converting the analog signal to form a continuous digital signal relating to the measured signal, the A/D converting means being adapted to receive controlling signals from the receiving means and to operate in accordance therewith.

8. A system according to claim 7, wherein the analog signals from the transducers are sampled substantially equidistantly in time in the A/D converting means.

9. A system according to claim 7, wherein the at least two transducer means each output a continuous digital signal and wherein the rate of transmission of data in the continuous-digital signals is substantially equal to the rate of conversion in the A/D converter means.

10. A system according to claim 7, wherein the at least two transducer means each output a non-continuous digital signal and wherein the rate of transmission of data in the non-continuous digital signals is higher than the rate of conversion in the A/D converter means.

11. A system according to claim 7, wherein the A/D converting means comprise means for altering the characteristics of the analog signal prior to conversion thereof.

12. A system according to claim 11, wherein the means for altering the characteristics of the analog signal prior to conversion thereof are adapted to receive controlling signals output from the receiving means and to operate in accordance therewith.

13. A system-according to claim 7, wherein the A/D converting means comprise means for altering the characteristics of the digital signal subsequent to conversion of the analogue signal.

14. A system according to claim 13, wherein the means for altering the characteristics of the digital signal subsequent to conversion of the analogue signal are adapted to be receive controlling signals from the receiving means and to operate in accordance therewith.

15. A system according to claim 7, wherein the A/D converting means comprise means adapted to alter specifics of the analogue-to-digital conversion.

16. A system according to claim 15, wherein the means adapted to alter specifics of the analogue-to-digital conversion are adapted to receive controlling signals from the receiving means and to operate in accordance therewith.

17. A system according to claim 1, wherein the digital signals are transmitted from the transducer means to the receiving means without any deliberate delay.

18. A system according to claim 17, wherein the A/D converting means comprise means for altering the characteristics of the analog signal prior to conversion thereof.

19. A system according to claim 18, wherein the means for altering the characteristics of the analog signal prior to conversion thereof are adapted to receive controlling signals output from the receiving means and to operate in accordance therewith.

20. A system according to claim 17, wherein the A/D converting means comprise means for altering the characteristics of the digital signal subsequent to conversion of the analogue signal.

21. A system according to claim 20, wherein the means for altering the characteristics of the digital signal subsequent to conversion of the analogue signal are adapted to be receive controlling signals from the receiving means and to operate in accordance therewith.

22. A system according to claim 17, wherein the A/D converting means comprise means adapted to alter specifics of the analogue-to-digital conversion.

23. A system according to claim 22, wherein the means adapted to alter specifics of the analogue-to-digital conversion are adapted to receive controlling signals from the receiving means and to operate in accordance therewith.

24. A system according to claim 1, wherein the transducer means are adapted to generate additional data for use in the receiving means and to output said data to the transmitting means.

25. A system according to claim 24, wherein the additional data relate to the status of the transducer means.

26. A system according to claim 24, wherein the additional data relate to the identity of the transducer means.

27. A system according to claim 24, wherein the additional data relate to a delay caused by the transducer means between measurement of the signal and output of the relating signal.

28. A system according to claim 24, wherein the A/D converting means comprise means for altering the characteristics of the analog signal prior to conversion thereof.

29. A system according to claim 28, wherein the means for altering the characteristics of the analog signal prior to conversion thereof are adapted to receive controlling signals output from the receiving means and to operate in accordance therewith.

30. A system according to claim 24, wherein the A/D converting means comprise means adapted to alter specifics of the analogue-to-digital conversion.

31. A system according to claim 30, wherein the means adapted to alter specifics of the analogue-to-digital conversion are adapted to receive controlling signals from the receiving means and to operate in accordance therewith.

32. A system according to claim 24, wherein the A/D converting means comprise means adapted to alter specifics of the analogue-to-digital conversion.

33. A system according to claim 32, wherein the means adapted to alter specifics of the analogue-to-digital conversion are adapted to receive controlling signals from the receiving means and to operate in accordance therewith.

34. A system according to claim 1, wherein the transmitting means consist of no more than two electrical or a single optical conductor and furthermore comprise an additional electrical conductor for each transducer means for shielding no more than two electrical or a single optical conductor from external noise.

35. A system according to claim 1, wherein the receiving means comprises a power supply for supplying power to at least one transducer means, wherein the transmitting means are constituted by two electrical conductors also transmitting power from the power supply to the at least one transducer means.

36. A system according to claim 1, wherein the clocking signal generators of the at least two transducer means are adapted to generate clocking signals having a frequency lower than that generated by the common clocking signal generator.

37. A system according to claim 1, wherein the clocking signal generators of the at least two transducer means are adapted to generate clocking signals having substantially identical frequencies.

38. A system according to claim 1, wherein the clocking signal generators of the at least two transducer means are adapted to generate clocking signals having different frequencies.

39. A transducer means for use in the system according to claim 1, the transducer means being adapted to one of the group consisting of:

encode information in the signals generated thereby, the information received by the receiving means comprising information relating to the time of measurement of the relating measured signal, sample the signal to be measured at the same time and in accordance with a clocking signal transmitted by the central unit, and measure the continuous signal in a manner controlled by a clocking signal generated by a clocking signal generator generating comprised in the transducer means, the clocking signal generator generating a signal at least substantially independent on the clocking signals of clocking signal generators of other transducer means.

40. A method of operating a system for measuring a continuous signal, the system comprising:

at least two transducer means for measuring the continuous signal and for each outputting a digital signal relating to the measured signal, the transducer means being adapted to receive controlling signals and to operate in accordance therewith, receiving means for receiving and processing signals from each transducer means and comprising means for generating controlling signals for controlling the operation of the transducer means, transmitting means for transmitting the signals from each transducer means to the receiving means, and means for transmitting the controlling signals from the receiving means to the transducer means, and wherein the receiving means generate the controlling signals controlling the operation of the transducer means, the controlling signals output from the receiving means are transmitted by the transmitting means which are one of the group consisting of: consisting of no more than two electrical conductors, consisting of no more than one optical conductor, and comprising transmitters and receivers for wireless communication, the method comprising one of the group consisting of:

the transducer means encode information in the signals generated thereby, the information received by the receiving means comprising information relating to the time of measurement of the relating measured signal, the receiving means using this information in timing or synchronizing of signals, a clocking signal is transmitted from a central unit to all transducer means so that all transducer means sample the signal to be measured at the same time and in accordance with this clocking signal, and each of the at least two transducer means comprises a clocking signal generator generating a signal at least substantially independent on the clocking signals of the clocking signal generators of the other transducer means, each transducer means is adapted to measure the continuous signal in a manner controlled by the clocking signal generated by the individual transducers' clocking signal generator, and the receiving means comprise a common clocking signal generator and is adapted to perform a re-sampling of the received signals to the common clocking signal generated by the common clocking signal generator, so that the receiving means are adapted to, from two signals received from two transducer means measuring a signal emitted from a signal emitting means, determine within a calculatable upper uncertainty, which is less than 100 µs, any time difference between the measurement of the signal by the two transducer means.

41. A method system according to claim 40, wherein the measured signal is a varying signal having a periodic content, and wherein the calculatable upper uncertainty is less than 2 periods of the measured signal.

42. A method according to claim 40, wherein the period of the measured signal is that of a frequency thereof.

43. A method according to claim 40, wherein the calculatable upper uncertainty is 10 ms or less.

44. A method according to claim 40, wherein the transducer means comprise:

a transducer for measuring the signal to be measured and for outputting a continuous analog signal representative thereof, and A/D converting means for converting the analog signal to form a continuous digital signal relating to the measured signal, and wherein the A/D converting means operate in accordance with controlling signals generated by the receiving means.

45. A method according to claim 44, wherein characteristics of the analog signal are altered in the A/D converting means prior to conversion thereof in accordance with controlling signals generated by the receiving means.

46. A method according to claim 44, wherein characteristics of the digital signal are altered in the A/D converting means subsequent to conversion of the analogue signal in accordance with controlling signals generated by the receiving means.

47. A method according to claim 44, wherein specifics of the analogue-to-digital conversion are altered in the A/D converting means in accordance with controlling signals output from the receiving means.

48. A method according to claim 40, wherein the transducer means generate additional data for use in the receiving means in accordance with the controlling signals generated by the receiving means and output said data to the transmitting means.

49. A method according to claim 48, wherein the additional data relate to the status of the transducer means.

50. A method according to claim 48, wherein the additional data relates to the identity of the transducer means.

51. A method according to claim 48, wherein the additional data relates to a delay caused by the transducer means between measurement of the signal and output of the relating signal.

52. A method according to claim 40, wherein the clocking signal generators of the at least two transducer means generate clocking signals having a frequency lower than that generated by the common clocking signal generator.

53. A method according to claim 40, wherein the clocking signal generators of the at least two transducer means generate clocking signals having substantially identical frequencies.

54. A system according to claim 40, wherein the clocking signal generators of the at least two transducer means generate-clocking signals having different frequencies.

55. A system comprising:

at least two signal generating means transmitting continuous digital signals, means for receiving and processing the digital signals from the signal generating means, transporting means for transporting the digital signals from each signal generating means to the receiving means, power supply means for supplying power to the signal generating means, means for transporting power from the power supply means to the signal generating means, wherein the receiving means comprise the power supply means, and the transporting means are comprise the means for transporting power from the power supply to the signal generating means and are constituted by at the most two electrical conductors, wherein the transducer means are adapted to encode information in the signals generated thereby, the information received by the receiving means comprising information relating to the time of measurement of the relating measured signal, the receiving means being adapted to use this information in timing or synchronizing of signals, a central unit is adapted to transmit a clocking signal to all transducer means and where all transducer means are adapted to sample the signal to be measured at the same time and in accordance with this clocking signal, or each of the at least two transducer means comprises a clocking signal generator generating a signal at least substantially independent on the clocking signals of the clocking signal generators of the other transducer means, each transducer means is adapted to measure the continuous signal in a manner controlled by the clocking signal generated by the individual transducers' clocking signal generator, and the receiving means comprise a common clocking signal generator and is adapted to perform a re-sampling of the received signals to the common clocking signal generated by the common clocking signal generator, so that the means for receiving and processing the digit al signals being adapted to, from two digital signals received from two signal generating means, determine within a calculatable upper uncertainty being less than 100 $\mu$s, any time difference between the transmission of the two digital signals.

56. A system according to claim 55, wherein the measured signal is varying and has a periodic content, and wherein the calculatable upper uncertainty is less than 2 periods of the measured signal.

57. A system according to claim 56, wherein the period of the measured signal is that of a frequency thereof.

58. A system according to claim 55, wherein the calculatable upper uncertainty is 10 ms or less.

59. A system according to claim 55, wherein the digital signals comprise information relating to the time of transmission by the signal generating means in the time of receipt of the digital signals by the receiving means.

60. A system according to claim 55, wherein the signal generating means are chosen from the group consisting of computers, digital transducers, A/D converting means, DAT tape recorders.

61. A system according to claim 55, wherein the signal generating means are adapted to operate in accordance with controlling signals generated by the receiving means and transmitted from the receiving means to the signal generating means by the transporting means.

62. A system according to claim 55, wherein the clocking signal generators of the at least two signal generating means are adapted to generate clocking signals having a frequency lower than that generated by the common clocking signal generator.

63. A system according to claim 55, wherein the clocking signal generators of the at least two signal generating means are adapted to generate clocking signals having substantially identical frequencies.

64. A system according to claim 55, wherein the clocking signal generators of the at least two signal generating means are adapted to generate clocking signals having different frequencies.

* * * * *